March 12, 1957

A. HAZELTINE 2,785,376

APPARATUS FOR UTILIZING THE EARTH'S MAGNETIC
FIELD TO INDICATE AIRCRAFT VELOCITY

Filed March 4, 1955

United States Patent Office 2,785,376
Patented Mar. 12, 1957

2,785,376

APPARATUS FOR UTILIZING THE EARTH'S MAGNETIC FIELD TO INDICATE AIRCRAFT VELOCITY

Alan Hazeltine, Maplewood, N. J., assignor to Hazeltine Research, Inc., Chicago, Ill., a corporation of Illinois Application March 4, 1955, Serial No. 492,288

4 Claims. (Cl. 324—70)

General

This invention relates to apparatus usable aboard an aircraft for utilizing the earth's magnetic field for determining the velocity of the aircraft when moving therethrough.

In copending application Serial No. 458,123 of F. C. Halldén, entitled "Magnetic Velocity Indicator," filed September 24, 1954, now abandoned, there is disclosed and claimed apparatus for indicating the velocity of a body such as an aircraft when moving through the earth's magnetic field. The apparatus there described, while of general applicability, does not include provision for taking into account lateral drift of the aircraft in determining the true ground velocity thereof. As a result, the velocity indications, as far as the true ground velocity is concerned, may be somewhat in error, the magnitude of the error depending on the ratio of forward velocity to lateral drift velocity. For forward velocities substantially greater than the lateral drift velocity, the error in true ground velocity is negligible. For some applications, however, and where a greater degree of precision is desired, it is desirable to take into account the lateral drift of the aircraft in determining the true ground velocity thereof.

It is an object of the invention, therefore, to provide a new and novel method of and apparatus for utilizing the earth's magnetic field for determining the velocity of an aircraft moving therethrough and which takes into account lateral drift of the aircraft for determining the true ground velocity thereof both in magnitude and direction.

In accordance with the invention, apparatus usable aboard an aircraft for utilizing the earth's magnetic field for determining the velocity of the aircraft when moving therethrough comprises conductor elements for inducing a voltage therealong as the elements are moved through the earth's magnetic field. The apparatus also includes means for rotating the conductor elements about a horizontal axis for periodically reversing the polarity of the voltage along the conductor elements. The apparatus further comprises means for rotating the axis of rotation of the conductor elements in a horizontal plane to obtain indications of maximum and minimum magnitudes of the voltage alternations along the conductor elements, and means responsive to the maximum and minimum magnitudes of the voltage alternations for developing corresponding alternating signals of maximum and minimum magnitude, respectively, these maximum and minimum alternating signals being jointly representative of the true ground velocity of the aircraft.

For a better understanding of the present invention, together with other and further objects thereof, reference is had to the following description taken in connection with the accompanying drawings, and its scope will be pointed out in the appended claims.

Referring to the drawings.

Figure 1:
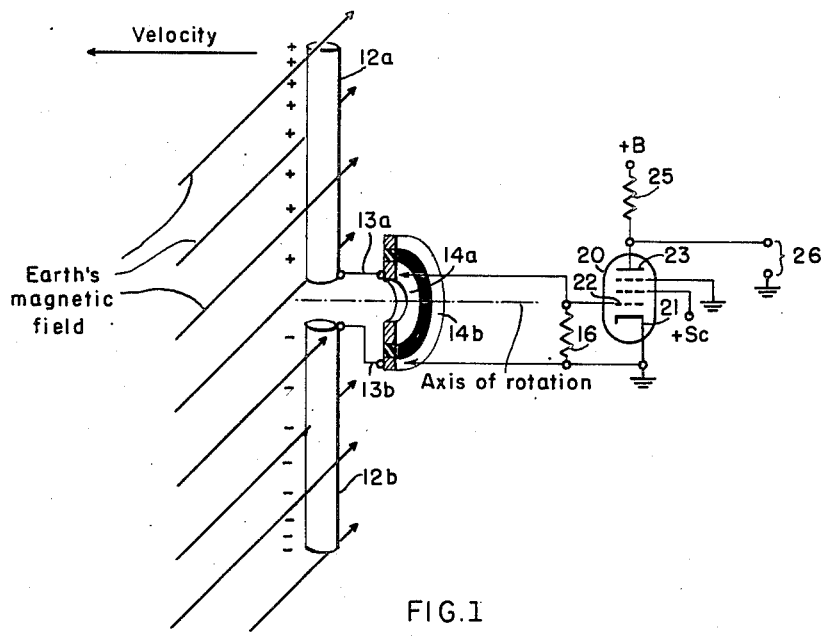
Fig. 1 is a circuit diagram of apparatus for utilizing the earth's magnetic field for determining the velocity of an aircraft moving therethrough.

Description of Fig. 1 apparatus

Referring to Fig. 1 of the drawings, there is shown apparatus as described in the mentioned copending application of Halldén for utilizing the earth's magnetic field for determining the velocity of an aircraft moving therethrough. The apparatus includes a pair of conductor elements $12a$ and $12b$, mounted end-to-end along a straight line with a small air gap or other suitable insulation gap between the adjacent ends thereof. The apparatus is designed to be mounted aboard an aircraft so that the forward velocity thereof due to the motion of the aircraft is as indicated on the drawing. The apparatus also includes means (not shown) for rotating the conductor elements $12a$ and $12b$ about an axis in line with the forward motion of the aircraft and passing through the center of the insulation gap between the conductor elements $12a$ and $12b$ as indicated in the drawing.

Attached to the adjacent ends of the conductor elements $12a$ and $12b$ are a pair of lead wires $13a$ and $13b$ which are, in turn, connected to a pair of slip-rings $14a$ and $14b$ for enabling electrical connection to the conductor elements to be unaffected by the mechanical rotation of the conductor elements. The apparatus also includes impedance means connected between the adjacent ends of the conductor elements $12a$ and $12b$ for enabling redistribution of electrons from one to the other of conductor elements as will be mentioned hereinafter. The impedance means may include, for example, a resistor $16$ having a high value of resistance and connected between the adjacent ends of the conductor elements $12a$ and $12b$ by means of the slip rings $14a$ and $14b$ and the lead wires $13a$ and $13b$.

The apparatus may further include an amplifier tube $20$ having a cathode $21$, a control electrode $22$, and an anode $23$, the anode being coupled through a load resistor $25$ to a source of operating potential $+B$. The control electrode $22$ and cathode $21$ of the tube $20$ are connected across the resistor $16$ for amplifying the signal developed thereacross which amplified signal is then supplied by way of the load resistor $25$ to a pair of output terminals $26$, $26$.

Operation of Fig. 1 apparatus

Considering the operation of the apparatus just described, it is well known that moving a conductor through a magnetic field causes a potential gradient and, hence, a voltage to be induced along the conductor. As a result, electrons within the conductor are subjected to an electric force which causes them to migrate to one end of the conductor so as to make that end of the conductor more negative and the other end more positive. As is generally known, the magnitude of this induced voltage depends upon the rate at which the lines of force of the magnetic field are cut and, hence, upon the velocity of the conductor.

Where the conductor is mounted on a moving body such as an aircraft, any attempt to measure the induced voltage or potential difference between the opposite extremities of such a single conductor by connecting measuring equipment thereacross will fail because the measuring equipment is moving with the same velocity as is the conductor and, hence, an opposing voltage will be induced across the terminals of the measuring equipment which is exactly equal and opposite to the potential difference to be measured. The indication of measuring equipment connected in this manner would thus be zero regardless of the configuration of the parts of the measuring equipment.

It is proposed in the aforesaid Hallden application, however, to obtain a measure of the voltage induced along such a moving conductor by splitting the conductor into two elements, connecting the adjacent ends thereof to one another through a suitable impedance, and rotating the conductor elements about the midpoint of the air gap between the adjacent ends thereof. In this manner with, for example, the conductor element 12a in the upper portion, as indicated in the drawing, the voltage induced along the conductor elements causes the electrons to migrate through the resistor 16 to the lower end of the element 12b. Now, as the conductor elements are rotated through 180° so that the conductor element 12b is in the upper portion, then the accumulation of electrons on the element 12b migrates back through the resistor 16 in order to again make the upper conductor element more positive than the lower conductor element.

In this manner, as the conductor elements 12a and 12b are continuously rotating, electrons are continually passing back and forth through the resistor 16 and there is thus developed across the resistor 16 an alternating signal of frequency dependent on the speed of rotation of the conductor elements. The amplitude of this alternating signal is dependent on the magnitude of the voltage induced along the conductor elements due to the forward velocity thereof and is, hence, representative of the forward velocity. In this manner, the apparatus may be utilized aboard an aircraft for indicating the forward velocity thereof. The alternating signal developed across resistor 16 is amplified by the tube 20 and may be supplied by way of output terminals 26, 26 to a suitable indicating device.

In Fig. 1, the representative flux lines of the earth's magnetic field are shown as being at right angles to the direction of motion of the apparatus and, hence, the aircraft and the axis of rotation. For this situation, no voltage is induced along the conductor elements 12a and 12b solely as a result of the angular rotation thereof because such angular rotation is not effective to cut flux lines. Thus, the induced voltage is due solely to the forward or linear motion of the apparatus.

In practice, however, the apparatus will frequently be moving at other than right angles to the flux lines of the earth's magnetic field so that there will be a component along the axis of rotation. Only the perpendicular component of the earth's field, however, will be effective in inducing voltage along the conductor elements 12a and 12b useful for velocity measurement since motion in the direction of the axis of rotation does not cut components along the axis. Accordingly, provision must be made for taking into account the direction of motion of the apparatus with respect to the direction of the flux lines of the earth's magnetic field before the voltage indications may be properly interpreted. A magnetic compass and a dipping needle or dip circle may be utilized to supply the desired information.

Where the apparatus is moving at other than right angles to the earth's magnetic field, rotation of the conductor elements 12a and 12b is then effective to cut the component of the flux lines of the earth's field parallel to the axis of rotation. But, considering the direction of the voltage induced solely by angular rotation in that situation, it will be seen that a constant direct-current voltage is induced along each of the conductor elements 12a and 12b and that the polarity of this voltage along one conductor is opposite to that along the other conductor element, hence causing these direct-current voltages due solely to angular rotation to cancel one another. In any event, no direct current will flow through the resistor 16 because there is no closed direct-current path. Accordingly, the magnitude of the alternating signal developed by the passage of electrons to and fro through the resistor 16 is dependent only on the forward or linear velocity of the apparatus and is not affected by the angular rotation of the conductor elements 12a and 12b.

Figure 2:
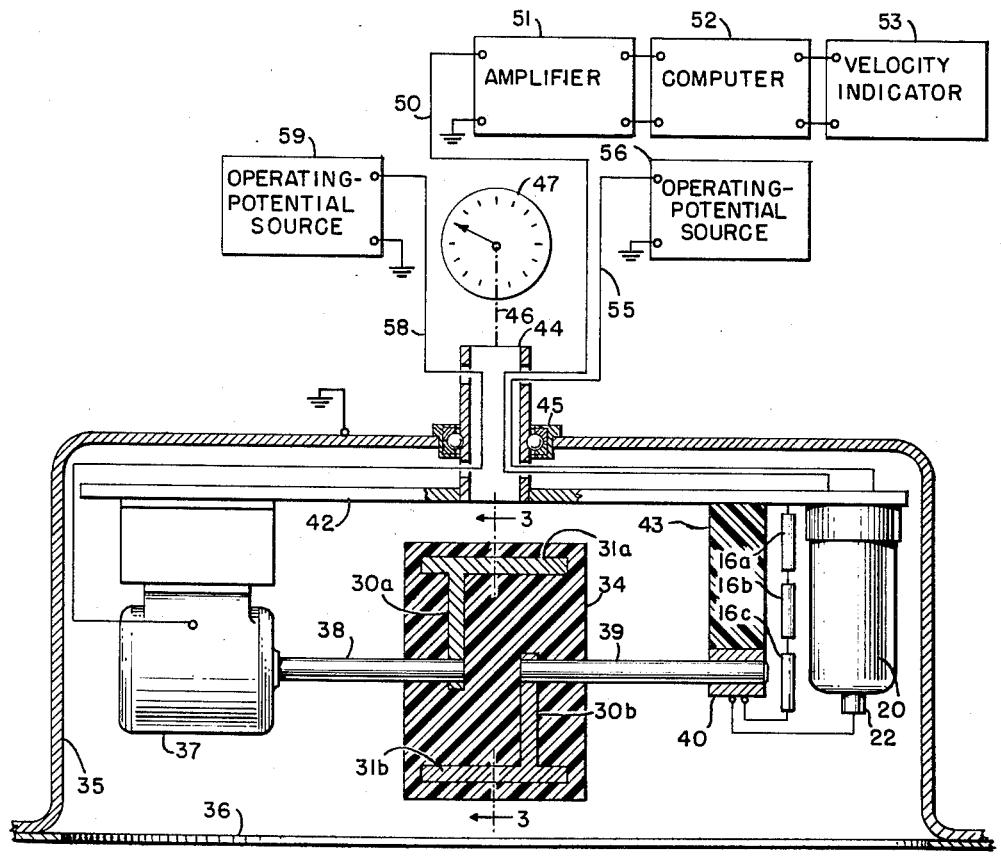
Fig. 2 is a diagram, partly schematic, of apparatus constructed in accordance with the present invention for taking into account lateral drift of the aircraft in determining the true ground velocity thereof.

*Description of Fig. 2 apparatus*

Figure 3:
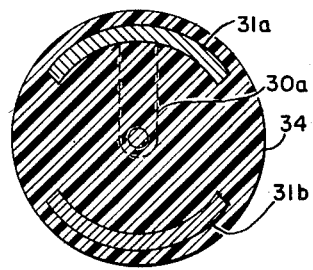
Fig. 3 is a sectional view on the plane of the section line 3—3 of Fig. 2.

As mentioned, apparatus in accordance with Fig. 1 fails to include provision for taking into account lateral drift of the aircraft in determining the true ground velocity thereof. Referring now to Fig. 2 of the drawings, there is shown apparatus usable aboard an aircraft for utilizing the earth's magnetic field for determining the velocity of the aircraft when moving therethrough and useful in practicing a method whereby the lateral drift of the aircraft may be taken into consideration in determining the true ground velocity thereof. The apparatus comprises a pair of conductor elements 30a and 30b for inducing a voltage therealong as the elements are moved through the earth's magnetic field, the magnitude of the voltage being dependent on the velocity of the aircraft. These conductor elements 30a and 30b correspond to the conductor elements 12a and 12b of the Fig. 1 apparatus and are the elements which are effective for cutting the earth's magnetic field and thereby inducing a voltage therealong. Attached to the far ends of each of the conductor elements 30a and 30b are corresponding metallic members 31a and 31b for increasing the electrical capacitance between the far ends of conductor elements. The members 31a and 31b may be partially cylindrical in shape as indicated in the sectional view of Fig. 3 which is a view on the plane of section line 3—3 of Fig. 2.

The conductor elements 30a and 30b are preferably embedded in a cylindrical block of plastic material 34 in order to enable the elements to withstand the centrifugal stresses and to provide a smooth surface of revolution so as to minimize air friction. The cylindrical block 34 including the conductor elements may be mounted in a recess or open box 35 which is affixed to the underside 36 of the aircraft fuselage in such a manner that the bottom edge of the box 35 is flush with the underside 36 of the fuselage. The bottom of the box 35 is open because a complete enclosure would have electric charges built up on its surface that would cancel out the voltage induced in the conductor elements 30a and 30b. Even with the open box, some such charges are built up and cause a reduction in the available voltage, but this reduction is not serious if the conductor elements are not mounted too deeply within the recess.

Apparatus in accordance with the present invention also includes means for rotating the conductor elements 30a and 30b about a horizontal axis for periodically reversing the polarity of the voltage along these conductor elements. Such means may include a motor 37 and drive shaft means 38 and 39 coupled to the conductor elements for producing rotation thereof. As shown, the drive shaft 38 is attached to the conductor element 30a while the shaft 39 is attached to the conductor element 30b.

The apparatus further includes means for rotating the axis of rotation of the conductor elements 30a and 30b in a horizontal plane to obtain indications of maximum and minimum magnitudes of the voltage alternations along the conductor elements. This means includes, for example, a metal turntable 42 upon which the motor 37 and conductor elements 30a and 30b are suitably mounted. The far end of shaft 39 is held by a suitable shaft bearing 40 which, in turn, is attached to the turntable 42 by means of a supporting member 43 which is made of electrical insulation material such as a plastic. The metal turntable 42 is held within the enclosure 35 by means of a shaft 44 attached to the turntable and a suitable shaft bearing indicated generally at 45 such that the turntable 42 is free to rotate in a horizontal plane. In this manner the axis of rotation of the conductor elements 30a and 30b, which corresponds to the longitudinal axis of the shafts 38 and 39, may be rotated in the horizontal plane by rotating the turntable shaft 44. The turntable shaft 44 may be, in turn, suitably coupled as indicated by dashed line 46 to an indicating scale 47 for indicating the orientation of the axis of rotation of the conductor elements with respect to the longitudinal axis of the aircraft fuselage.

The apparatus also includes means responsive to the maximum and minimum magnitudes of the voltage alternations for developing corresponding alternating signals of maximum and minimum magnitudes, respectively, these maximum and minimum magnitudes being jointly representative of the true ground velocity of the aircraft. Such means may include, for example, impedance means coupled between the adjacent ends of the conductor elements 30a and 30b for developing the desired alternating signals. Such impedance means includes, for example, the series-connected resistors 16a–16c which are connected by way of the metal shaft bearing 40 and metal shaft 39 to the conductor element 30b and by way of the metal turntable 42, the housing of motor 37, and the metal shaft 38 to the conductor element 30a. In this manner, the electron migrations produced by the voltage alternations along the conductor elements 30a and 30b are allowed to pass through the series-connected resistors 16a–c. The terminal of resistor 16c which is connected to the shaft bearing 40 is also connected to the control electrode 22 of the amplifier tube 20 which is preferably mounted on the turntable 42 and suitably insulated therefrom. Tube 20 corresponds to the similarly numbered tube of the Fig. 1 apparatus while series-connected resistors 16a–c correspond to resistor 16 of that figure.

Tube 20 serves to amplify the alternating signals developed across the resistors 16a–c which amplified signals are, in turn, supplied by way of a conductor 50 to an amplifier 51 of conventional construction. Amplifier 51 is effective to further amplify the alternating signals which are then supplied to a computer 52 wherein the amplitude thereof is suitably modified in accordance with the strength of the earth's magnetic field at the particular locality of the aircraft for reasons which will appear hereinafter. The modified signals are, in turn, supplied to a velocity indicator 53 for giving the desired indication of the velocity of the aircraft. The velocity indicator 53 may be, for example, a conventional alternating-current meter for indicating the magnitudes of the signals supplied thereto.

Operating potentials are supplied to the amplifier tube 20 by way of a conductor 55 which is connected to a suitable source of operating potential 56. In a similar manner, operating potentials are supplied to the motor 37 by way of a conductor 58 which is connected to a source of suitable operating potential 59.

In order to insure that an alternating signal of usable magnitude is supplied to the amplifier tube 20, the total resistance of the resistors 16a–c should be very high, for example, in the order of 100 megohms, while the interelectrode capacitance between the control electrode 22 and cathode of the tube 20 should be as small as possible. As a result, it may, as shown in Fig. 2, be desirable to use three series-connected resistors instead of a single resistor to reduce uncertainties due to leakage paths over the surfaces of the resistors. To reduce the interelectrode capacitance, it appears to be desirable to use a pentode-type tube with a cap-type control-electrode terminal because of the low interelectrode capacitance thereof. A pentode is desirable to prevent the Miller effect; and a variable-mu type is preferable so that the grid can be biased to a high negative value (say 5 volts), making the grid conductance negligible without a serious reduction in plate current.

The motor 37 is preferably of the high-speed type, capable of rotating at a rate of, for example, 400 revolutions per second. Also, care must be taken in the selection, location, and shielding of the motor so that the magnetic fields associated therewith will not interfere with and obscure the signals produced due to the conductor elements 30a and 30b cutting the earth's magnetic field. As an alternative, a hydraulic-type motor driven by a suitable air blast may be utilized.

*Operation of Fig. 2 apparatus*

Figure 4:
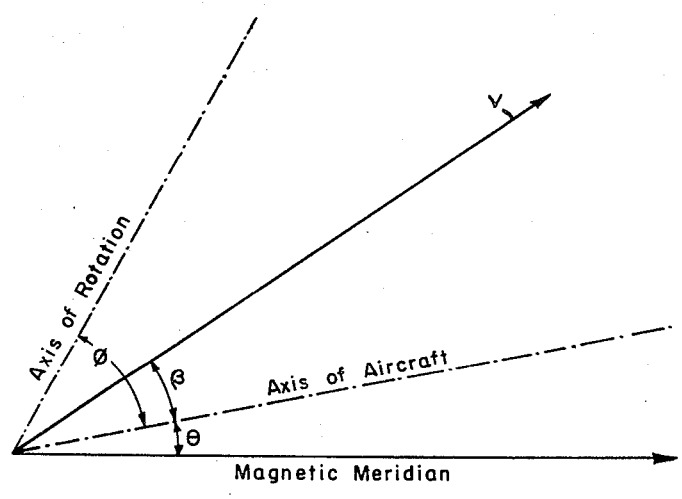
Fig. 4 is a vector diagram used in explaining the operation of the Fig. 2 apparatus.

Considering the operation of the apparatus just described, it will initially be necessary to consider some vector relationships in order to understand how the conductor elements 30a and 30b of Fig. 2 may be utilized to take into account the lateral drift of the aircraft in determining its true ground velocity. Such vector relationships are shown in Fig. 4 of the drawings wherein there is shown a representative magnetic meridian which indicates the direction of the horizontal component of the earth's magnetic field. The axis of the airplane, that is, the longitudinal axis of the fuselage, is indicated as a line making an arbitrary angle $\theta$ with the magnetic meridian. This axis of the aircraft, however, does not necessarily correspond to the true velocity of the aircraft because lateral components of the wind velocity may give rise to a certain amount of the lateral drift of the aircraft which occurs in addition to the forward motion thereof. Accordingly, the true ground velocity of the aircraft is represented by a vector $v$ making an angle $\beta$ with respect to the axis of the aircraft. Now the axis of rotation of the conductor elements 30a and 30b corresponds to the longitudinal axis of the shafts 38 and 39 of the Fig. 2 apparatus, and because this portion of the apparatus is mounted on a turntable 42, the axis of rotation may be rotated in a horizontal plane. Accordingly, a representative axis of rotation is represented on the Fig. 4 diagram as making an angle $\phi$ with the axis of the aircraft. This angle $\phi$ is indicated on the scale of the indicator 47 of the Fig. 2 apparatus.

Now, assuming for the moment that the conductor elements 30a and 30b are not undergoing angular rotation and are cutting the flux lines of the earth's magnetic field at right angles thereto then the induced voltage along the conductor elements is determined by the expression:

$$E = Bvl \quad (1)$$

where $E$ = the total induced voltage along both conductor element 30a and conductor element 30b;
$B$ = the flux density of the earth's magnetic field;
$v$ = the velocity of the aircraft;
$l$ = the total effective length of the conductor elements.

If the conductor elements are rotated by the motor 37 at an angular velocity $\omega$, then the induced voltage will be alternating with the angular frequency $\omega$ and with a peak magnitude determined by Equation 1.

In order to derive an expression for the true ground velocity of the aircraft, it is convenient to think of the earth's magnetic field as being composed of vertical and horizontal components. In this manner, if the horizontal component of the earth's flux density is $B_h$, its projection normal to the true ground velocity $v$ is then determined by the expression:

$$B_h \sin(\theta + \beta) \quad (2)$$

The corresponding voltage induced by this horizontal component of the earth's field is at its peak value when the conductor elements are in a vertical position. This peak value of induced voltage is obtained by substituting the expression of Equation 2 for B of Equation 1 which gives the expression:

$$E_h = B_h vl \sin(\theta + \beta) \quad (3)$$

where $E_h$ = the peak value of the induced voltage due to the horizontal component of the earth's magnetic field.

If the dip angle is $\delta$, then the vertical component of the earth's magnetic field is given by the expression:

$$B_v = B_h \tan \delta \quad (4)$$

The corresponding voltage induced by this vertical component of the earth's magnetic field is at its peak value when the conductor elements 30a and 30b are in a horizontal position or, in other words, when the conductor elements are cutting the vertical flux lines at right angles thereto. In order to obtain an expression for the peak value of this induced voltage, it is necessary to consider the component of the velocity $v$ which is normal to the conductor elements 30a and 30b because this is the component of velocity which determines the rate at which the vertical flux lines are cut by the total length $l$ of the conductor elements 30a and 30b. This component of the velocity $v$ which is normal to the conductor elements is given by the expression:

$$v \cos (\phi - \beta) \quad (5)$$

Now, inserting the expression for the flux density given by Equation 4 and the expression for the normal velocity given by Equation 5 into Equation 1 gives the peak value $E_v$ of the voltage induced by the vertical component of the earth's field as:

$$E_v = B_h v l \tan \delta \cos (\phi - \beta) \quad (6)$$

The two peak voltages $E_h$ and $E_v$, induced by the horizontal and vertical components, respectively, of the earth's magnetic field, are effectively in time quadrature with one another and so add by squares giving a total peak-induced voltage $E$ determined by the expression:

$$E = \sqrt{E_h^2 + E_v^2} \quad (7)$$

Substituting the values of $E_h$ and $E_v$ as given by Equations 3 and 6 into this last Equation 7 results in the expression:

$$E = B_h v l \sqrt{\sin^2 (\theta + \beta) + \tan^2 \delta \cos^2 (\phi - \beta)} \quad (8)$$

which indicates the general relationship between the total peak-induced voltage, the strength of the horizontal component of the earth's magnetic field, the true ground velocity of the aircraft, and the various angular relationships. It will be noted that the expression includes the angle $\beta$ which represents the drift angle of the aircraft which results from the lateral drift thereof. As indicated by Equation 8, the true ground velocity of the aircraft may not be precisely determined without taking the drift angle $\beta$ into account.

Generally speaking, there is no readily available method of determining the drift angle of the aircraft. In accordance with the present invention, however, a method will now be described whereby such drift angle may be taken into account in determining the true ground velocity of the aircraft. By solving Equation 8 to determine the maximum and minimum values of the total-induced voltage $E$ as a function of angle $\phi$, it will be seen that the total-induced voltage $E$ is a maximum when:

$$\phi = \beta \text{ or } \beta \pm \pi \quad (9)$$

This denotes the condition where the conductor elements 30a and 30b are rotating in a plane at right angles to the true direction of motion of the aircraft $v$ and, hence the conductor elements are cutting flux lines at the maximum rate.

From Equation 8 it may also be shown that the total induced voltage $E$ has a minimum value when:

$$\phi = \beta \pm \pi/2 \quad (10)$$

This represents the condition where the conductor elements 30a and 30b are rotating in a plane parallel to the true direction of motion of the aircraft, in which case only horizontal flux lines of the earth's magnetic field are being cut, this occurring when the conductor elements are in a vertical position.

Utilizing the expression of Equation 9 to simplify Equation 8, it will be seen that the maximum induced voltage $E_{max}$ is given by the expression:

$$E_{max} = B_h v l \sqrt{\sin^2 (\theta + \beta) + \tan^2 \delta} \quad (11)$$

Similarly, when Equation 8 is simplified by the relationship of Equation 10, it will be seen that the minimum induced voltage $E_{min}$ is given by the expression:

$$E_{min} = B_h v l \sin (\theta + \beta) \quad (12)$$

Now, combining Equations 11 and 12 results in the expression:

$$\sqrt{E_{max}^2 - E_{min}^2} = B_h v l \tan \delta \quad (13)$$

Simplifying Equation 13 by the relationship of Equation 4 and solving for the true ground velocity $v$ results in the expression:

$$v = \frac{\sqrt{E_{max}^2 - E_{min}^2}}{B_v l} \quad (14)$$

Equation 14 indicates that the maximum and minimum magnitudes of the induced voltages are jointly representative of the true ground velocity of the aircraft and take into account the lateral drift thereof. Hence, from these maximum and minimum indications, a knowledge of the strength of the vertical component of the earth's field at the location of the aircraft, and the total effective length of the conductor elements 30a and 30b, the magnitude of the true ground velocity of the aircraft may be readily determined. A suitable computer 52, as indicated in Fig. 2, may be utilized to combine these required bits of information in order to give a visual indication of the magnitude of the true ground velocity on an indicator or meter 53. This, of course, requires that information concerning the strength of the vertical component of the earth's magnetic field be supplied to the computer 52. This information may be secured from published data or by utilizing a magnetometer device.

Velocity is a vector quantity. The relationship of Equation 14 permits determination of the magnitude aspect of the true ground velocity. For navigational purposes, it is equally important to know the directional aspect of the velocity, that is, the true direction of motion of the aircraft. The apparatus of the present invention offers three possible ways of determining the true direction of motion. First, the true direction of motion of the aircraft is along the axis of rotation of the conductor elements when the induced voltage is a maximum. This direction is indicated visually by the pointer associated with the calibrated scale of indicator 47. In this manner, the true direction of motion with respect to the longitudinal axis of the fuselage of the aircraft, that is, the drift angle, is indicated. Conventional compass means may then be utilized to determine the absolute direction of motion with respect to the ground. If desired, the drift angle data and compass data may be combined by suitable electronic or electromechanical circuitry so as to provide a direct indication of the absolute direction of motion with respect to the ground.

Secondly, the true direction of motion of the aircraft is along an axis at right angles to the axis of rotation of the conductor elements when the induced voltage is a minimum. This method of determining true direction may be more advantageous where the voltage minimums are sharper than the voltage maximums.

Thirdly, if neither of the first two methods gives sufficiently precise results, the angle $\theta + \beta$ between the true direction of motion and the magnetic meridian can be determined by utilizing a relationship that may be determined by combining Equations 12 and 13, namely:

$$\sin(\theta+\beta) = \tan\delta \cdot \frac{E_{min}}{\sqrt{E_{max}^2 - E_{min}^2}} \quad (15)$$

This method of measuring true ground velocity fails at the magnetic equator where the vertical component of the earth's magnetic field vanishes and $E_v$ goes to zero, in which case only the horizontal component is available. In this case, the total induced voltage E is the same for all positions of the axis of rotation in the horizontal plane as indicated by Equation 8 where the $\tan^2\delta$ term becomes zero. This is because the conductor elements 30a and 30b are cutting only horizontal flux lines which means the peak voltage is induced only when the conductor elements are in a vertical position, and when the conductor elements are in a vertical position, it is immaterial in which direction the axis of rotation lies. As a result, at the magnetic equator it is possible to determine only the east-west component $v \sin(\theta+\beta)$ of the true ground velocity of the aircraft. This limitation is not too serious, however, because the extent of the earth's magnetic equator does not cover much of the earth's surface.

Looking towards the rotating conductor elements from the output terminals thereof, it appears that the rotating conductor elements are analogous to the lumped-constant circuitry of a condenser in series with an alternating-current signal source, where the capacitance of the condenser is equal to the capacitance between the conductor elements and the peak magnitude of the voltage produced by the signal source is equal to the peak magnitude of the induced voltage. Because of this series-condenser effect, the magnitude of the voltage developed across resistor 16 may be less than the magnitude of the induced voltage by the amount of the voltage drop across the series condenser. As the voltages under consideration are alternating in nature, the magnitude of any voltage drop across the series condenser depends on the frequency of the voltages, which, in turn, depends on the speed of rotation of the conductor elements. To prevent uncertainty in the resulting velocity measurements, the speed of rotation of the conductor elements may be maintained constant by utilizing a constant-speed motor. This gives a constant proportionality factor between induced voltage and voltage developed across resistor 16, which factor may be taken into account when calibrating the apparatus. An alternative approach is to make the value of resistor 16 very large, in which case the relationship between induced voltage and voltage across resistor 16 becomes essentially constant and independent of the speed of rotation of the conductor elements. Where this later expedient is utilized, it may be desirable to place a heat source in the box 35 to prevent moisture films from forming on the apparatus therein and lowering the resistance of leakage paths around the resistor 16.

As mentioned, the alternating signal developed across resistor 16 is of a single frequency which is equal to the frequency of rotation of the conductor elements. Accordingly, the amplifier 51, for example, may be a very sharply tuned amplifier which is tuned to this frequency of rotation. Such sharp tuning is advantageous as it considerably reduces the effect of any electrical noise that may be present. Additionally, a sharply tuned amplifier permits ready adjustment of the motor speed to the desired rate.

From the foregoing description of the invention, it will be apparent that the invention represents a new and novel method of and apparatus for utilizing the earth's magnetic field to indicate the true ground velocity of an aircraft moving therethrough.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Apparatus usable aboard an aircraft for utilizing the earth's magnetic field for determining the velocity of the aircraft when moving therethrough, the apparatus comprising: conductor elements for inducing a voltage therealong as the elements are moved through the earth's magnetic field; means for rotating the conductor elements about a horizontal axis for periodically reversing the polarity of the voltage along the conductor elements; means for rotating the axis of rotation of the conductor elements in a horizontal plane to obtain indications of maximum and minimum magnitudes of the voltage alternations along the conductor elements; and means responsive to the maximum and minimum magnitudes of the voltage alternations for developing corresponding alternating signals of maximum and minimum magnitude, respectively, these maximum and minimum alternating signals being jointly representative of the true ground velocity of the aircraft.

2. Apparatus usable aboard an aircraft for utilizing the earth's magnetic field for determining the velocity of the aircraft when moving therethrough, the apparatus comprising: a pair of extended conductor elements mounted adjacent each other with a small insulation gap between the adjacent ends thereof for inducing a voltage therealong as the conductor elements are moved through the earth's magnetic field; means for rotating the conductor elements about a horizontal axis for periodically reversing the polarity of the voltage along the conductor elements; means for rotating the axis of rotation of the conductor elements in a horizontal plane to obtain indications of maximum and minimum magnitudes of the voltage alternations along the conductor elements; and impedance means coupled between the adjacent ends of the conductor elements and responsive to the maximum and minimum magntiudes of the voltage alternations for developing corresponding alternating signals of maximum and minimum magnitude, respectively, these maximum and minimum alternating signals being jointly representative of the true ground velocity of the aircraft.

3. Apparatus usable abroad an aircraft for utilizing the earth's magnetic field for determining the velocity of the aircraft when moving therethrough, the apparatus comprising: conductor elements for inducing a voltage therealong as the elements are moved through the earth's magnetic field; mechanical means including a motor and drive shaft means coupled to the conductor elements for rotating the conductor elements about a horizontal axis for periodically reversing the polarity of the voltage along the conductor elements; means for rotating the axis of rotation of the conductor elements in a horizontal plane to obtain indications of maximum and minimum magnitudes of the voltage alternations along the conductor elements; and means responsive to the maximum and minimum magnitudes of the voltage alternations for developing corresponding alternating signals of maximum and minimum magnitude, respectively, these maximum and minimum alternating signals being jointly representative of the true ground velocity of the aircraft.

4. Apparatus usable aboard an aircraft for utilizing the earth's magnetic field for determining the velocity of the aircraft when moving therethrough, the apparatus comprising: conductor elements for inducing a voltage therealong as the elements are moved through the earth's magnetic field; means for rotating the conductor elements about a horizontal axis for periodically reversing the polarity of the voltage along the conductor elements; mechanical means including a turntable upon which the rotating conductor elements are mounted for rotating the axis of rotation of the conductor elements in a horizontal plane to obtain indications of maximum and minimum magnitudes of the voltage alternations along the conductor elements; and means responsive to the maximum and minimum magnitudes of the voltage alternations for developing corresponding alternating signals of maximum and minimum magnitude, respectively, these maximum and minimum alternating signals being jointly representative of the true ground velocity of the aircraft.

References Cited in the file of this patent

UNITED STATES PATENTS 2,108,099    Brooks  ---------------- Feb. 15, 1938

FOREIGN PATENTS 582,433    France  ---------------- Oct. 15, 1924